United States Patent [19]

Urig et al.

[11] Patent Number: 4,623,462

[45] Date of Patent: Nov. 18, 1986

[54] OIL FILTERS USING WATER-BASED LATEX BINDERS

[75] Inventors: Elmer R. Urig, Avon Lake; James E. Park, Lorain, both of Ohio

[73] Assignee: The BF Goodrich Company, Akron, Ohio

[21] Appl. No.: 665,478

[22] Filed: Oct. 29, 1984

[51] Int. Cl.$^4$ ............................................. B01D 39/18
[52] U.S. Cl. ...................................... 210/496; 162/135; 210/508; 427/244; 427/391
[58] Field of Search ................. 162/135; 210/504, 506, 210/508, 496; 427/244, 389.9, 391; 428/511-514

[56] References Cited

U.S. PATENT DOCUMENTS

| | | | |
|---|---|---|---|
| 2,976,167 | 3/1961 | Maeder et al. | 427/389.9 |
| 3,224,592 | 12/1965 | Burns et al. | 210/508 |
| 3,520,416 | 7/1970 | Keedwell | 210/508 |
| 3,788,878 | 1/1974 | Wheelock | 427/389.9 |
| 4,018,647 | 4/1977 | Wietsma | 427/389.9 |
| 4,119,543 | 10/1978 | Lawson et al. | 210/508 |
| 4,333,971 | 6/1982 | Van Eenam | 427/391 |

FOREIGN PATENT DOCUMENTS

| | | | |
|---|---|---|---|
| 57-113810 | 7/1982 | Japan | 210/508 |
| 486762 | 1/1976 | U.S.S.R. | 210/508 |

*Primary Examiner*—Peter Hruskoci
*Attorney, Agent, or Firm*—George A. Kap; Alan A. Csontos

[57] ABSTRACT

This invention relates to impregnated oil filter substrate and to oil filters containing such impregnated substrates that require a single cure and can pass a hot oil immersion test, said filter substrate being impregnated with a water-based binder comprising a latex containing at least 20% polymerized vinyl chloride in the latex solids, said latex being a copolymer of vinyl chloride, 30 to 60% lower alkyl acrylate, and one or more comonomers selected from acrylic acid and N-methylol acrylamide, said comonomers being used in an amount of up to 5%, based on the weight of the monomers used to make the latex; said binder also containing 5 to 20 parts of a cross-linking resin per 100 weight parts of latex solids and 5 to 20% catalyst for the cross-linking resin based on the weight of the cross-linking resin.

13 Claims, No Drawings

OIL FILTERS USING WATER-BASED LATEX BINDERS

BACKGROUND OF THE INVENTION

The paper used as the filtration medium for automotive type filters has been traditionally treated with phenolic resole type resins. This has been done to improve the paper's strength properties and allow it to be pleated in an accordian-like shape and to hold this shape when the paper composite is cured. The standard phenolic resin used to treat automotive filter paper had relatively low mol ratios, on the order of 1.0/1 to 1.3/1 formaldehyde to phenol. This has been necessary so that good final paper properties, especially flexibility, could be achieved. Higher mol ratio resins tend to result in brittle paper on curing.

The traditional method of making an automotive filter has been for a paper maker to treat a base filter sheet with an alcohol solution of these phenolic resole resins. The treated sheet was passed through an oven to drive off the solvent and make a so-called B-stage sheet. This sheet was then shipped to the filter maker where it was pleated and put through an oven to further cure the sheet and to hold the shape of the pleats.

With the onset of greater concern for environmental quality, the filter manufacturers have requested paper suppliers to supply a formaldehyde-free impregnated sheet that holds its pleat, and meets all of the requirements for oil filters.

This invention is directed to oil filters and oil filter media impregnated with a water-based latex containing polymerized vinyl chloride. Such oil filters are manufactured with only a single cure and do not impair the environment by emitting volatile solvents.

SUMMARY OF THE INVENTION

Impregnated oil filter media and oil filters incorporating same are made by impregnating oil filter paper or a suitable nonwoven with an aqueous latex selected from homopolymers of a vinyl halide or a vinylidene halide and copolymers wherein a vinyl halide and/or a vinylidene halide is polymerized with other comonomers. Manufacture of such oil filters does not contribute to any air polution through escape of a volatile solvent.

DETAILED DESCRIPTION OF THE INVENTION

The use of a water-based binder in making impregnated paper or nonwoven for oil filters is desirable from at least one point of view: the elimination of the volatile solvent used in the past in connection with phenolic binders. The volatile solvent, such as an alcohol, was detrimental in that it contributed to air polution when the filter medium was dried thus releasing the alcohol into the atmosphere. The use of volatile solvents in such operations is being curtailed in response to ever more stringent environmental controls.

In an attempt to produce oil filters with a water-based binder, several aqueous latexes were tried, all, however, unsuccessfully. Such binders included polyvinyl chloride, acrylonitrile/butadiene, butadiene/styrene/arylonitrile, acrylate/styrene, and other latexes. Composites based on these water-based binders lacked the necessary stability in the hot oil immersion test in that the resin binder was extracted into the hot oil.

Following the initial unsuccessful attempts with water-based binders, several additional composite samples were prepared with various aqueous latexes crosslinked with a variety of cross-linking agents. In carrying out these experiments, conventional unbonded filter paper was saturated with these crosslinkable binders, and the saturated filter paper was then evaluated by an outside party that commercially produces impregnated filter paper for the oil filter manufacturers. After a thorough evaluation, crosslinkable polyvinyl chloride latex was selected as a suitable binder in the production of impregnated oil filter medium whereas the other binders were not suitable.

Therefore, this invention is directed to oil filters and oil filter media selected from filter paper and nonwovens impregnated with a crosslinkable aqueous polyvinyl halide latex. The resulting impregnated oil filter media have the necessary resistance to hot oil and meet other physical properties. The latex described herein is admixed with a cross-linking resin and a catalyst for the cross-linking resin before it is used to impregnate filter paper or a nonwoven filter substrate which is then dried and cured at an elevated temperature. The latex solids, prior to impregnation, are adjusted with water to a solids content of about 5 to 70%, preferably 10 to 30%, and pH thereof is adjusted to about 4 to 12, preferably to the alkaline side of 7 to 9.

Suitable polymeric aqueous latexes for saturating or impregnating filter paper or a nonwoven filter medium are selected from homopolymers of a vinyl halide or a vinylidene halide and copolymers of a vinyl halide and/or vinylidene halide with other copolymerizable monomers. In a preferred embodiment, suitable latexes are selected from homopolymers of vinyl chloride and copolymers of vinyl chloride with other copolymerizable monomers. Amount of polymerized vinyl chloride in such latexes can vary from a minimum of about 5% by weight up to 100% for the homopolymers, but preferably the copolymers contain at least about 20% of polymerized vinyl chloride and most preferably contain in excess of about 40% polymerized vinyl chloride. Preferred polymers in the latexes have Tg in the range of 0° C. to 100° C. but more preferably 20° C. to 50° C.

There is a large variety of comonomers that can be polymerized with a vinyl halide in producing aqueous copolymer latexes. The term "copolymer", for purposes herein, defines a polymer of two or more monomers. On the basis of this definition, vinyl halide and/or vinylidene halide, preferably vinyl chloride, can be copolymerized with one or more of comonomers such as $\alpha,\beta$-olefinically unsaturated carboxylic acids containing 3 to 5 carbon atoms, such as acrylic, methacrylic, ethacrylic and cyanoacrylic acids; monounsaturated dicarboxylic acids containing 4 to 8 carbon atoms, such as fumaric and maleic acids; esters of $\alpha,\beta$-olefinically unsaturated carboxylic acids containing 3 to 5 carbon atoms and monounsaturated dicarboxylic acids containing 4 to 20 but preferably 4 to 12 carbon atoms, such as methyl acrylate, ethyl acrylate, butyl acrylate, 2-ethylhexyl acrylate, octyl acrylate, ethyleneglycol dimethacrylate, diethylene glycol diacrylate, cyanoethyl acrylate, methyl methacrylate, butyl methacrylate, hydroxypropyl methacrylate, ethyl maleate, butyl fumarate, maleic dimethyl ester, maleic acid mono-(2-ethylhexyl)ester, fumaric acid diethyl ester, and fumaric acid dilauryl ester; $\alpha,\beta$-olefinically unsaturated nitriles containing 3 to 5 carbon atoms, such as acrylonitrile and methacrylonitrile; acrylamides derived from acrylic and methacrylic acids and their N-alkylol and N-alkoxyalkyl derivatives containing 1 to 20 but preferably 1 to 12 carbon atoms, such as acrylamide itself, N-methylol acrylamide, N-butoxy methacrylamide, methylenebisacrylamide, methacrylamide, N-octyl acrylamide, diacetone acrylamide, and hydroxymethyl diacetone acrylamide; vinyl ethers containing 4 to 22 caron atoms, such as ethyl vinyl ether, chloroethyl vinyl ether, isobutyl vinyl ether, cetyl vinyl ether, and lauryl vinyl ether; vinyl ketones containing 3 to 12 carbon atoms, such as methyl vinyl ketone; vinyl esters of carboxylic acids containing 4 to 22 carbon atoms, such as vinyl acetate, vinyl propionate, vinyl formate, vinyl stearate, vinyl benzoate, and vinyl and allyl chloroacetate; α-olefins containing 2 to 12 carbon atoms, such as ethylene, propylene, isobutylene, and butene-1; styrene and styrene derivatives such as α-methyl styrene, vinyl toluene, and chlorostyrene; and other polyfunctional monomers such as vinyl naphthalene, vinyl pyridine, divinyl benzene, and allyl pentaerythritol.

Preferred latexes are copolymers of vinyl chloride, a lower alkyl acryate, and an acrylic acid. Amount of vinyl chloride in such latexes generally exceeds 40% by weight of the monomer weight, preferably being in the range of about 40 to 70 dry weight parts, whereas the lower alkyl acrylate is used in an amount exceeding 20% of the total monomer weight, preferably being in the range of about 30 to 60 dry weight parts. Amount of an acrylic acid, preferably acrylic acid itself, is use in an amount of up to about 5% of total monomer weight, preferably about 0.5 to 3 weight parts. The amounts given herein in weight parts are based on a total of 100 weight parts of all monomers in the latex. As used herein, the "lower" alkyl acrylate monomer is defined as containing about 1 to 8 carbon atoms in the alkyl moiety. The preferred latexes can also contain about 0.5 to 2 weight parts of an alkylol acrylamide containing 1 to 4 carbon atoms in the alkylol group. Amount of the alkylol acrylamide is based on 100 weight part of all the monomers in the latex.

Preferred latexes are prepared by emulsion polymerization of vinyl chloride and one or more comonomers. Comonomers for the preferred latexes include acrylic and methacrylic acids and alkyl esters derived therefrom which contain 1 to 20 carbon atoms, preferably 2 to 12, in the alkyl group; amides derived from α,β-olefinically unsaturated carboxylic acids and their N-alkylol and N-alkoxyalkyl derivatives such as acrylamide, N-octyl acrylamide, and hydroxymethyl diacetone acrylamide; and vinylidene halides, such as vinylidene chloride. Specific examples of preferred latexes containing polyvinyl chloride are copolymers of the following monomers: vinyl chloride, 2-ethylhexyl acrylate, vinylidene chloride, and acrylic acid; vinyl chloride, 2-ethylhexyl acrylate, vinylidene chloride, and hydroxymethyl diacetone acrylamide; vinyl chloride and methyl acrylate; vinyl chloride, butyl acrylate, acrylic acid, and N-methylol acrylamide; and vinyl chloride, 2-ethylhexyl acrylate, vinylidene chloride, and hydroxypropyl methacrylate. The latexes can be plasticized or unplasticized.

The polymer latexes embodied herein are prepared employing conventional polymerization techniques in an aqueous medium with a suitable polymerization catalyst. Overpolymerization of the monomers may also be employed. Aqueous dispersions of solution polymers may be used.

The aqueous medium may be emulsifier-free or it may contain an emulsifier. When emulsifiers are used to prepare the latexes of this invention, the usual types of anionic and non-ionic emulsifiers may be employed. Useful anionic emulsifiers include alkali metal or ammonium salts of the sulfates of alcohols having from 8 to 18 carbon atoms such as sodium lauryl sulfate; ethanolamine lauryl sulfate, ethylamine lauryl sulfate; alkali metal and ammonium salts of sulfonated petroleum and paraffin oils; sodium salts of sulfonic acids such as dodecane-1-sulfonic acid and octadiene-1-sulfonic acid; aralkyl sulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium-n-octadecyl sulfosuccinamate; alkali metal or ammonium salts of the free acid of complex organic mono- and diphosphate esters; and the like. Non-ionic emulsifiers such as octyl- or nonylphenyl polyethoxyethanol may also be used. Latexes having excellent stability are obtained with the alkali metal and ammonium salts of aromatic sulfonic acids, aralkyl sulfonates, long chain alkyl sulfonates and poly(oxyalkylene)sulfonates.

If an emulsifier is used, this may range up to about 6% or more by weight based on the monomers, but it preferably is less than 6%, and excellent results have been obtained with less than 1%. The emulsifier may be entirely added at the outset of the polymerization or it may be added incrementally or by proportioning throughout the run. Typically, a small amount of the emulsifier is added at the outset of the polymerization and the remainder charged incrementally or proportionately to the reactor as the monomers are proportioned.

The polymerization may be conducted at temperatures from about 0° C. or less to about 100° C. in the presence of a compound capable of initiating the polymerizations. Commonly used free radical initiators include the various peroxygen compounds such as persulfate, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds such as sodium sulfite or sodium bisulfide, a reducing sugar, dimethylamino propionitrile, a diazomercapto compound and a water-soluble ferricyanide compound, or the like. Heavy metal ions may also be used to activate the persulfate catalyzed polymerization. Polymer latices having excellent stability are obtained with alkali metal and ammonium persulfate polymerizations. The amount of initiator used will generally be in the range between about 0.1% to 3% by weight based on the total monomers and preferably is between about 0.15% and 1% by weight. The initiator may be charged completely at the outset of the polymerization, however, incremental addition or proportioning of the initiator throughout the polymerization may also be employed and is often advantageous.

Typical polymerizations for the preparation of the latexes herein are conducted by charging the reactor with the appropriate amount of water and electrolyte, if any is to be employed, a portion of the emulsifier, if any, and a portion of the initator sufficient to initiate the polymerization. The reactor is then evacuated, heated to the initiation temperature and charged with a portion of the monomer premix which is previously prepared by mixing water, emulsifier, the monomers and polymerization modifiers, if any are employed. After the initial monomer charge has been allowed to react for a period of time, the proportioning of the remaining monomer premix is begun, the rate of proportioning being varied depending on the polymerization temperature, the particular initiator employed and the amount of vinyl halide monomer being polymerized. After all the monomer premix has been charged, the final addition of initiator is made and the reaction continued with agitation for a length of time necessary to achieve the desired conversion.

In the latex, the particle size may be in the range of about 0.1 micrometer. A generally satisfactory particle size may be, however, from about 0.05 to about 5 micrometers. The total solids of the latexes may be varied widely and may relate to the fluidity wanted in the composition, with a 10% total solids latex providing more water than a 50 or 65% total solids latex.

Latexes suitable for the use described herein must coalesce at process conditions. This is easily determined by placing a latex in an oven and drying it to see whether a continuous film or a discontinuous powder resin is formed. Film forming latexes from a powder resin type latex by the above test can be made by uniformly blending with the latex about 10 to 100 parts by weight of one or more plasticizers per 100 parts by weight of the resin. The useful plasticizers may be described as the alkyl and alkoxy alkyl esters of dicarboxylic acids or the esters of a polyhydric alcohol and a monobasic acid. As examples of such materials, there may be named dibutyl phthalate, dioctyl phthalate, dibutyl sebacate, dinonyl phthalate, di(2-ethyl hexyl)phthalate, di(2-ethyl hexyl)adipate, dilauryl phthalate, dimethyl tetrachlorophthalate, butyl phthalate, butyl glycollate, glyceryl stearate, and the like. The preferred plasticizers are the liquid diesters of aliphatic alcohols having from 4 to 20 carbon atoms and dibasic carboxylic acids having from 6 to 14 carbon atoms.

A suitable latex that can be prepared as described herein, has the following formulation, in parts by weight:

demineralized water: 77
vinyl chloride: 50
ethyl acrylate: 48
acrylic acid: 2
sodium persulfate: 0.4
tetrasodium pyrophosphate: 0.3
sodium alpha olefin sulfonate: 1.7 (40%)
caustic: to alkaline pH The above latex has Tg of 37° C., total solids of 54%, and a pH of 7.5 which is adjusted with addition of a sufficient amount of caustic. The latexes containing polymerized vinyl halide and/or vinylidene halide may be compounded with, or have mixed herein, other known ingredients, such as fillers, plasticizers, antioxidants or stabilizers, antifoaming agents, pigments, or other compounding aids. Furthermore, thickeners or bodying agents may be added to the polymer latices so as to control the viscosity of the latexes and thereby achieve the proper flow properties for the particular application desired.

The polyester nonwovens, which can be used as a filter substrate, are generally sold in batt form which are made of fibers about 2.5 to 5 centimeters long and weigh about 6 to 600 grams per square meter. Cellulosic substrates, such as filter paper, can also be used as a filter substrate. A specific type of paper that is eminently suitable for use as a filter substrate is 280 micrometers bleached kraft filter paper weighing 31 grams per square meter with a density of 3.6 kilograms per cubic meter.

A latex of a water-insoluble homopolymer or copolymer of the present invention may be applied to the web or mat of fibers in any suitable fashion such as by spraying, dipping, roll-transfer, or the like. Application of the latex to the fibers is preferably made at room temperature to facilitate cleaning of the associated apparatus. The solids concentration of the latex is in the range of 5% to 60% by weight, and preferably from 5% to 25% when applied by dipping. When applied by roll-transfer, solids concentration of the latex is generally about 50% whereas with the spraying technique, it can range widely.

An acid catalyst in an amount of about 0.1 to 5, preferably 0.5 to 3 weight parts per 100 weight parts of the latex solids, is preferably included in the latex at the time it is applied to the substrate. Examples of acidic catalysts that may be employed include oxalic acid, dichloracetic acid, ammonium chloride, p-toluenesulfonic acid, and ammonium sulfate and amine salts such as the hydrochloride of 2-methyl-2-aminopropanol-1.

The proportion of the latex polymer that is applied to the filter paper or a nonwoven substrate is such as to provide 15 to 100%, preferably about 20%, by weight of the polymer, based on the total weight of the substrate. After application of the latexes to the substrate, the impregnated or saturated substrate can be dried either at room temperature or at elevated temperature. The substrate is subjected, either after completion of the drying or as the final portion of the drying stage itself, to a baking or curing operation which may be effected at a temperature of about 100° to about 400° C. for a period which may range from about one-half hour at the lower temperatures to as low as five seconds at the upper temperatures. The conditions of baking and curing are controlled so that no appreciable deterioration or degradation of the substrate or polymer occurs. Preferably, the curing is effected at a temperature of 120° to 165° C. for a period of 2 to 10 minutes.

Several different cross-linking resins have been found to provide the desired degree of cross-linking of the basic latex polymer and render it stiffer and resistant to hot oil. Amount of the cross-linking resins recommended for use herein is in the range of 1 to 30 weight parts, preferably 5 to 20 parts, per 100 weight parts of latex solids. Examples of suitable cross-linking agents include water-dispersible or water-soluble resins, which, with the aid of a catalyst, promote the cross-linking of the principal polymer in the latex. Examples of suitable cross-linking resins include emulsified epoxy resins, melamine-formaldehyde resins, urea-formaldehyde resins, lower alkoxy lower alkyl melamine resins, phenol-formaldehyde resins, polyacrylate resins containing pendant unsaturation, and other cross-linking resins. Certain of these resins are rendered water-dispersible, as by emulsification, so that they are compatible with the aqueous latex.

A specific example of a suitable epoxy resin that can be used to promote cross-linking of the latex, is the CMD 35201 epoxy resin dispersion available from Celanese Plastics and Specialties Company. This is an emulsified resin so that it can be compatible with the aqueous latex. Its epoxide equivalent is in the range of 550–650 and it has a Durran's melting point of 75°–85° C. The dispersion is mechanically stable and no organic solvents are present. This epoxy dispersion and other cross-linking resins can be cured through both epoxy functionality and hydroxyl functionality. Curing agents most conveniently employed are those which are water soluble or dispersible and are stable in an aqueous medium. Examples of such agents include dicyandiamide, various substituted imidazoles, aliphatic and aromatic amines, melamine resins, and urea-formaldehyde resins. Viscosity of this dispersion is about 12,000 cps measured at 25° C. and at 10 rpm, Brookfield RVT.

To promote the action of the cross-linking resins, a suitable catalyst is used in amount of 1 to 30% by weight of the cross-linking resin, preferably 5 to 20%. Suitable catalysts include ammonium chloride, tridimethyl aminoethyl phenol, and the like. The ammonium chloride is a useful acid catalyst for the melamine and phenol-formaldehyde cross-linking resins whereas tridimethyl aminoethyl phenol is an especially suitable catalyst in conjunction with the emulsified epoxy cross-linking resins.

The invention disclosed herein is illustrated with the following examples that demonstrate impregnation of conventional unbonded filter paper with various binders and subsequent evaluation for suitability in oil filters.

EXAMPLE 1

Samples of binder formulations were prepared using different binders to impregnate unbonded filter paper for use in oil filters. The binders were latexes and resins with and without cross-linking agents and catalysts for the cross-linking agents. In samples 1 to 7, water was added to the binder to adjust total solids to 15% whereas in samples 8 to 10, total solids was 20%. Ammonium hydroxide was used to adjust pH of the binders to 8.5, whenever needed. The formulations for samples 1 to 10, in weight parts, are set forth in Table I, below:

consisted of 50 weight parts vinyl chloride, 48 parts ethyl acrylate, and 2 parts acrylic acid prepared in the presence of sodium persulfate, tetrasodium pyrophosphate, sodium alpha olefin sulfonate, and caustic. The pH of the PVC latex was 7.5 and its Tg was 37° C. Latex B was also a water-based latex of 50 weight parts ethyl acrylate, 15 parts butyl acrylate, 30 parts acrylonitrile, 3 parts acrylamide, and 2 parts N-methylol acrylamide. Latex C was also a water-based latex of 34 parts butadiene, 31 parts styrene, and 35 parts acrylonitrile. X-linker A was a modified melamine-formaldehyde resin, more specifically, hexamethoxy methyl melamine, i.e., Cymel 373, available from American Cyanamid. X-linker B was a water-dispersible phenol-formaldehyde resin, i.e., Durez 14798, available from Occidental Petroleum Company. X-linker C was a non-ionic aqueous dispersion of a solid Bisphenol A epoxy resin, i.e., CMD 35201, available from Celanese Plastics and Specialties Company. Ammonium chloride served as an acid catalyst for the modified melamine-formaldehyde resin or X-linker A, whereas the amine catalyst, which was tridimethyl aminoethyl phenol, served as a catalyst for the emulsified epoxy resin or X-linker C. The aziridine resin served as a low temperature curing agent.

In preparing the impregnated filter paper with the various binders, strips of unbonded filter paper were placed on a wire screen and immersed in a binder and then pulled across a vacuum slot to remove excess binder. The impregnated filter paper samples were then dried on a photoprint drier at 100° C. for 5 minutes and then cured at 177° C. for 5 minutes. Pickup of latex solids varied from about 17 to 23%.

Samples of filter paper impregnated with the various binders disclosed in Table I were then submitted to an outside party for evaluation for oil filter use. The impregnated filter paper samples were evaluated for strength, resistance to hot oil, stiffness, and flexibility. On the basis of the evaluation, only the PVC latex A was selected as an acceptable water-based latex as a binder for filter paper for use in an oil filter, especially with the emulsified epoxy resin as the x-linking resin and the amine catalyst therefor.

TABLE I

| Material | % TS | #1 | #2 | #3 | #4 | #5 | #6 | #7 | #8 | #9 | #10 |
| --- | --- | --- | --- | --- | --- | --- | --- | --- | --- | --- | --- |
| PVC Latex A | 56.1 | 100/178.3 | 100/178.3 | 100/178.3 | 100/178.3 | 100/178.3 | 100/178.3 | 100/178.3 | — | — | — |
| Latex B | 48.1 | — | — | — | — | — | — | — | 100/207.9 | 100/207.9 | — |
| Latex C | 41.5 | — | — | — | — | — | — | — | — | — | 100/241.0 |
| X-Linker A | 85.0 | — | 10/11.8 | 20/23.6 | — | — | — | — | — | 10/11.8 | — |
| X-Linker B | 65.0 | — | — | — | 10/15.4 | — | — | — | — | — | — |
| X-Linker C | 60.0 | — | — | — | — | 10/16.7 | 20/33.4 | — | — | — | — |
| Aziridene Resin | 100 | — | — | — | — | — | — | 10/10.0 | — | — | — |
| NH Cl Cat. | 100 | 1/1.0 | 2/2.0 | 1/1.0 | — | — | — | — | — | 1/1.0 | — |
| Amine Cat. | 30.0 | — | — | — | — | 1/3.3 | 2/6.6 | — | — | — | — |

Table I, above, presents formulations for samples 1 to 10. The percent total solids (% TS) is given for each component of the formulation, and amounts of each component are given on dry and wet basis, i.e., 100/178.3 indicates 100 weight parts on dry basis and 178.3 indicates 178.3 weight parts on wet basis. The PVC Latex A was prepared by emulsion polymerization in an aqueous medium and the polymeric product

EXAMPLE 2

Additional samples of binder formulations 11 to 18 were prepared, as in Example 1. Ammonium hydroxide was used to adjust pH of the binders to 8.5 and water was added to reach 15% total solids. The binders were then used to impregnate 280 micrometer flat filter paper, in the manner described in Example 1, to obtain 20% pickup. The impregnated sheets were dried at 100° C. for 5 minutes, cured at 149° C. for 5 minutes, and evaluated for dry and wet tensile strength. Lastly, the impregnated sheets were immersed in 10/40W oil at 177° C. for 96 hours and again tested for tensile strength. Formulations of binder samples 11 to 18, tensile strength data for impregnated sheets after single curing, and tensile strength data for the impregnated sheets after single curing and after hot oil immersion test, are given in Table II, below:

TABLE II

| Material | % TS | #11 | #12 | #13 | #14 | #15 | #16 | #17 | #18 |
|---|---|---|---|---|---|---|---|---|---|
| PVC Latex A | 54.9 | 100/182.1 | 100/182.1 | 100/182.1 | 100/182.1 | — | — | — | — |
| PVC Latex B | 48.9 | — | — | — | — | 100/204.5 | 100/204.5 | 100/204.5 | 100/204.5 |
| X-Linker A | 85.0 | 10/11.8 | — | — | — | 10/11.8 | — | — | — |
| X-Linker B | 65.0 | — | 10/15.4 | — | — | — | 10/15.4 | — | — |
| X-Linker C | 60.0 | — | — | 10/16.7 | — | — | — | 10/16.7 | — |
| NH Cl Cat. | 100 | 1/1.0 | — | — | — | 1/1.0 | — | — | — |
| Amine Cat. | 30.0 | — | — | 1/3.3 | — | — | — | 1/3.3 | — |
| *Tensile Strength After Curing* | | | | | | | | | |
| Dry, g/cm. | | 7822 | 8537 | 9019 | 9144 | 8019 | 9233 | 1010 | 8965 |
| Wet, g/cm. | | 4232 | 3500 | 2857 | 2607 | 5090 | 4161 | 3500 | 3446 |
| *Tensile Strength After Curing And Oil Immersion* | | | | | | | | | |
| g/cm. | | 776 | 794 | 721 | 544 | 482 | 580 | 496 | 316 |

In the above table, PVC latex A was an aqueous latex of 50 weight parts vinyl chloride, 48 parts ethyl acrylate, and 2 parts acrylic acid prepared in an aqueous medium in the presence of sodium persulfate, tetrasodium pyrophosphate, sodium alpha olefin sulfonate, and caustic. Its pH was 7.5 and Tg 37° C. PVC latex B was also an aqueous latex of 63 weight parts vinyl chloride, 35 parts n-butyl acrylate, 1 part acrylic acid, and 1 part N-methylol acrylamide (48%), prepared in an aqueous medium in the presence of sodium persulfate, tetrasodium pyrophosphate, sodium alpha olefin sulfonate, and hydroxyl amine sulfate. Its pH was 5.0 and its Tg was 37° C. X-linker A was a modified melamine-formaldehyde resin, more specifically, hexamethoxymethyl melamine, i.e., Cymel 373, available from American Cyanamid. X-linker B was a water-dispersible phenol-formaldehyde resin, i.e., Durez 14798, available from Occidental Petroleum Company. X-linker C was a non-ionic aqueous dispersion of a solid Bisphenol A epoxy resin, i.e., CMD 35201, available from Celanese Plastics and Specialties Company. Ammonium chloride served as an acid catalyst for the modified melamine-formaldehyde resin or the x-linker A, whereas the amine catalyst, tridimethyl aminoethyl phenol, served as a catalyst for the emulsified epoxy resin or x-linker C.

EXAMPLE 3

More samples of binder formulations 19 to 29 were prepared, as in Example 1. Ammonium hydroxide was used to adjust pH of the binders to 8.5 and water was added to reach 15% total solids. The binders were then used to impregnate the same weight filter paper to obtain 20% pickup of latex solids. The impregnated sheets were dried at 100° C. for 5 minutes, cured at 149° C. for 5 minutes, and evaluated for dry and wet tensile strength. Lastly, the impregnated sheets were immersed in 10/40W oil at 177° C. for 96 hours and again tested for tensile strength. Formulations of binder samples 19 to 29, tensile strength data for impregnated sheets after a single curing, and tensile strength data after single curing and after the hot oil immersion test, are given in Table III, below.

TABLE III

| Material | % TS | #19 | #20 | #21 | #22 | #23 | #24 | #25 | #26 | #27 | #28 | #29 |
|---|---|---|---|---|---|---|---|---|---|---|---|---|
| PVC Latex A | 54.9 | 100/182.1 | 100/182.1 | 100/182.1 | 100/182.1 | — | — | — | — | 100/182.1 | 100/182.1 | — |
| PVC Latex B | 49.4 | — | — | — | — | 100/202.4 | 100/202.4 | 100/202.4 | 100/202.4 | — | — | 100/202.4 |
| X-Linker A | 85.0 | 10/11.8 | — | — | — | 10/11.8 | — | — | — | — | — | — |
| X-Linker B | 65.0 | — | 10/15.4 | — | — | — | 10/15.4 | — | — | 100/153.8 | — | — |
| X-Linker C | 60.0 | — | — | 10/16.7 | — | — | — | 10/16.7 | — | — | — | — |
| X-Linker D | 36.0 | — | — | — | 10/27.8 | — | — | — | 10/27.8 | — | — | — |
| NH Cl Cat. | 100.0 | 1/1.0 | — | — | — | 1/1.0 | — | — | — | — | — | — |
| Amine Cat. | 30.0 | — | — | 1/3.3 | — | — | — | 1/3.3 | — | — | — | — |
| *Tensile Strength After Curing* | | | | | | | | | | | | |
| Dry, g/cm. | | 8215 | 9001 | 9430 | 9198 | 8233 | 8608 | 9287 | 8644 | 7858 | 8947 | 8983 |
| Wet, g/cm. | | 5250 | 3447 | 3340 | 3804 | 4626 | 4179 | 3446 | 4072 | 4179 | 2625 | 3643 |
| *Tensile Strength After Curing And Oil Immersion* | | | | | | | | | | | | |
| g/cm. | | 2339 | 2607 | 2125 | 1732 | 3393 | 3214 | 3429 | 2125 | 6429 | 1678 | 1411 |

In the above table, PVC latex A was an aqueous latex of 50 weight parts vinyl chloride, 48 parts ethyl acrylate, and 2 parts acrylic acid prepared in an aqueous medium in the presence of sodium persulfate, tetrasodium pyrophosphate, sodium alpha olefin sulfonate, and caustic. Its pH was 7.5 and Tg 37° C. PVC latex B was also an aqueous latex of 63 weight parts vinyl chloride, 35 parts n-butyl acrylate, 1 part acrylic acid, and 1 part N-methylol acrylamide (48%), prepared in an aqueous medium in the presence of sodium persulfate, tetrasodium pyrophosphate, sodium alpha olefin sulfonate, and hydroxyl amine sulfate. Its pH was 5.0 and its Tg was 37° C. X-linker A was a modified melamine-formaldehyde resin, more specifically, hexamethoxymethyl melamine, i.e., Cymel 373, available from American Cyanamid. X-linker B was a water-dispersible phenol-formaldehyde resin, i.e., Durez 14798, available from Occidental Petroleum Company. X-linker C was a non-ionic aqueous dispersion of a solid Bisphenol A epoxy resin, i.e., CMD 35201, available from Celanese Plastics and Specialties Company. X-linker D was an aqueous acrylate resin of 55 weight parts ethyl acrylate, 30 parts methyl methacrylate, and 15 parts N-methylol acrylamide, available from The BFGoodrich Company as Carboset 533H resin. Ammonium chloride served as an acid catalyst for the modified melamine-formaldehyde resin or the x-linker A, whereas the amine catalyst, tridimethyl aminoethyl phenol, served as a catalyst for the emulsified epoxy resin or x-linker C.

The data in Table III shows that the latexes by themselves without crosslinkers, as in samples #28 and #29, have very poor tensile strength after oil immersion for 96 hours in 10W-40 oil at 177° C. of filter paper samples impregnated therewith.

We claim:

1. An oil filter comprising a filter substrate impregnated with a cured binder, said substrate being resistant to hot oil at 177° C. when immersed therein for 96 hours, said binder comprising a water-based latex selected from the group consisting of insoluble homopolymers of vinyl halide or vinylidene halide and insoluble copolymers of vinyl halide and/or vinylidene halide with one or more of copolymerizable monomers having a latex solids concentration of about 5 to 70% by weight, 1 to 30 weight parts per 100 weight parts of latex solids of cross-linking resin, and 1 to 30% by weight of said cross-linking resin of a catalyst for promoting the cross-linking of said latex; said copolymers contain at least 20% by weight of latex solids of a polymerized vinyl halide; said substrate is selected from filter paper and nonwoven fibers; and said cross-linking resin is selected from epoxy resins, melamine-formaldehyde resins, malamine resins, phenol-formaldehyde resins, polyacrylate resins, and mixtures thereof.

2. Oil filter of claim 1 wherein vinyl halide is vinyl chloride and said copolymers are polymers of vinyl chloride copolymerized with one or more of copolymerizable monomers selected from the group consisting of vinylidene chloride; alpha,beta-olefinically unsaturated carboxylic acids containing 3 to 5 carbon atoms; monounsaturated dicarboxyic acids containing 4 to 8 carbon atoms; esters of $\alpha,\beta$-olefinically unsaturated monocarboxylic and dicarboxylic acids containing 4 to 20 carbon atoms; acrylamides and methacrylamides and their N-alkylol derivatives containing 1 to 20 carbon atoms selected from the group consisting of hydroxyalkyl diacetone acrylamides and methacrylamides, hydroxyalkyl acrylamides and methacrylamides, N-alkylol acrylamides and methacrylamides, and mixtures thereof; vinyl ethers containing 4 to 22 carbon atoms; vinyl ketones containing 3 to 12 carbon atoms; vinyl esters of carboxylic acids containing 4 to 22 carbon atoms; alpha olefins containing 2 to 12 carbon atoms; styrene and styrene derivatives; and mixtures thereof.

3. Oil filter of claim 2 wherein amount of said cross-linking resin is in the range of about 5 to 20% by weight based on the weight of latex solids and wherein amount of said catalyst is in the range of 5 to 20% by weight based on the weight of the cross-linking resin.

4. Oil filter of claim 3 wherein said latex is selected from copolymers of 40 to 70% vinyl chloride, 30 to 60% lower alkyl acrylate and one or more monomers selected from acrylic acid and N-alkylol acrylamide, based on the total weight of all monomers used to make the latex.

5. Oil filter of claim 4 wherein amount of acrylic acid is 0.5 to 3% and amount of N-alkylol acrylamide is 0.5 to 2%, said lower alkyl acrylate containing 1 to 8 carbon atoms in the alkyl group and said N-alkylol acrylamide containing 1 to 4 carbon atoms in the alkylol group.

6. Oil filter of claim 5 wherein said N-alkylol acrylamide is N-methylol acrylamide, said cross-linking resin is emulsified epoxy resin, and said filter substrate requires a single cure of the binder during its preparation.

7. Filter substrate of claim 3 wherein said catalyst is selected from ammonium chloride, tridimethyl aminoethyl phenol, and mixtures thereof.

8. Oil filter of claim 2 wherein said catalyst is selected from ammonium chloride, tridimethyl aminoethyl phenol, and mixtures thereof.

9. Oil filter substrate comprising a substrate impregnated with a cured binder, said substrate being resistant to hot oil at 177° C. when immersed therein for 96 hours, said binder comprising a water-based latex selected from the group consisting of water insoluble homopolymers of vinyl halide or vinylidene halide and water insoluble copolymers of vinyl halide and/or vinylidene halide with one or more of copolymerizable monomers having a latex solids concentration of about 5 to 70% by weight, a cross-linking resin, and 1 to 30 weight parts per 100 weight parts of latex solids of a catalyst for promoting the cross-linking of said latex said copolymers contain at least 20% by weight of latex solids of a polymerized vinyl halide, said substrate is selected from filter paper and nonwoven fibers; and said cross-linking resin is selected from epoxy resins, melamine-formaldehyde resins, malamine resins, phenol-formaldehyde resins, polyacrylate resins, and mixtures thereof.

10. Filter substrate of claim 9 wherein amount of said cross-linking resin is in the range of about 5 to 20% by weight, based on the weight of latex solids, and wherein amount of said catalyst is in the range of 5 to 20% by weight, based on the weight of the cross-linking resin.

11. Filter substrate of claim 10 wherein said latex is selected from copolymers of 40 to 70% vinyl chloride, 30 to 60% lower alkyl acrylate and one or more monomers selected from acrylic acid and N-alkylol acrylamide, based on the total weight of all monomers used to make the latex.

12. Filter substrate of claim 11 wherein amount of acrylic acid is 0.5 to 3% and amount of N-alkylol acrylamide is 0.5 to 2%, said lower alkyl acrylate containing 1 to 8 carbon atoms in the alkyl group and said N-alkylol acrylamide containing 1 to 4 carbon atoms in the alkylol group.

13. Filter substrate of claim 12 wherein said N-alkylol acrylamide is N-methylol acrylamide, said cross-linking resin is emulsified epoxy resin, and said filter substrate requires a single cure of the binder during its preparation.

* * * * *